DYNAMIC MAGNETIC DEVICE

Filed July 28, 1959

INVENTORS
JACK G. HEWITT, JR.
JAMES C. SAGNIS JR.
PAUL E. STUCKERT
BY William V. Schelberg
AGENT United States Patent Office 3,123,717
Patented Mar. 3, 1964

3,123,717
DYNAMIC MAGNETIC DEVICE

Jack G. Hewitt, Jr., Pittsburgh, Pa., and James C. Sagnis, Jr., Ossining, and Paul E. Stuckert, Katonah, N.Y., assignors to International Business Machines Corporation, New York, N.Y., a corporation of New York Filed July 28, 1959, Ser. No. 830,114
13 Claims. (Cl. 307—88)

The invention relates to magnetic devices and more specifically to magnetic devices utilized in a variety of data handling circuits and systems wherein the basic element employed in fabricating the device is a magnetic element capable of assuming different stable states of residual magnetization and of being switched from one state to another by rotational processes.

Magnetic elements capable of attaining different stable states of residual flux density and characterized by their ability to be switched from one to another stable state by rotational processes have been found to possess excellent memory characteristics and because of their rotational switching behavior permit switching at very high speeds. One type material exhibiting the above characteristics is a magnetic thin film having a uniaxial anisotropy, i.e. an easy direction of magnetization.

Although materials exhibiting the characteristics defined above have been readily recognized as possessing static magnetic storage capabilities little work has been done to take advantage of the rotational switching characteristics of the material in order to fabricate dynamic storage devices and multiphase stable devices such as disclosed by J. Von Neumann in his Patent 2,815,488 and further described in an article entitled "A New Concept in Computing," by R. L. Wigington, Proc. IRE; vol 47, April 1959, pp. 516–523.

A novel device employing magnetic elements capable of being switched by rotational processes is disclosed in a copending application, Serial No. 823,909, filed June 30, 1959, now Patent No. 2,965,741 which is assigned to the same assignee. In this copending application the magnetic element is established in a given residual state of magnetization and the magnetic moments within the element are oscillated about this residual state. According to the teachings of this invention, a somewhat similar structure as provided in the forementioned copending application is employed but the circuit operation differs in that the magnetic moments of the magnetic element employed are continuously rotated in one or another direction. The novel device of this invention is constructed by providing a magnetic thin film element having an easy direction of magnetization and a plurality of winding means coupled to the element. A first winding of the winding means is wound in quadrature to the easy direction and is energized to apply a sinusoidal magnetic field parallel to the easy direction. A second winding is wound in quadrature to the first winding having a capacitor connected in parallel therewith to constitute a resonant circuit. The applied sinusoidal field rotates the magnetic moments of the element to induce a voltage in the second winding which charges the capacitor. As the applied varying field decays to reverse its direction, the capacitor discharges to energize the second winding and apply a field transverse to the easy direction of the element. This action completely rotates the moments in either a clockwise or a counter-clockwise direction and is continuous. Thus, once the magnetic moments of the element are started rotating in a given direction they are maintained in this rotational mode to define a first operating stable state. The resonant circuit is further utilized to provide output signals indicative of the operating state of the device and may also be employed to reverse the direction of rotation of the magnetic moments and establish the device in another stable operating state.

More strikingly, it has been found that with a device constructed in accordance with the above description, the operating stable state may be switched by application of a field applied substantially perpendicular to the plane of the film element.

It is then a prime object of this invention to provide novel magnetic bistable devices.

Another object of this invention is to provide a novel device fabricated of magnetic element having rotational switching characteristics in which the operational stable states of the device are defined by the direction which the magnetic moments constantly rotate.

A further object of this invention is to provide a novel magnetic bistable device employing a magnetic film material wherein the different operating stable states are defined by the direction which the magnetic moments rotate and which is switched from one operating state to another by application of a field substantially perpendicular to the plane of the film.

The foregoing and other objects, features and advantages of the invention will be apparent from the following more particular description of preferred embodiments of the invention, as illustrated in the accompanying drawings.

Figures 1, 2:
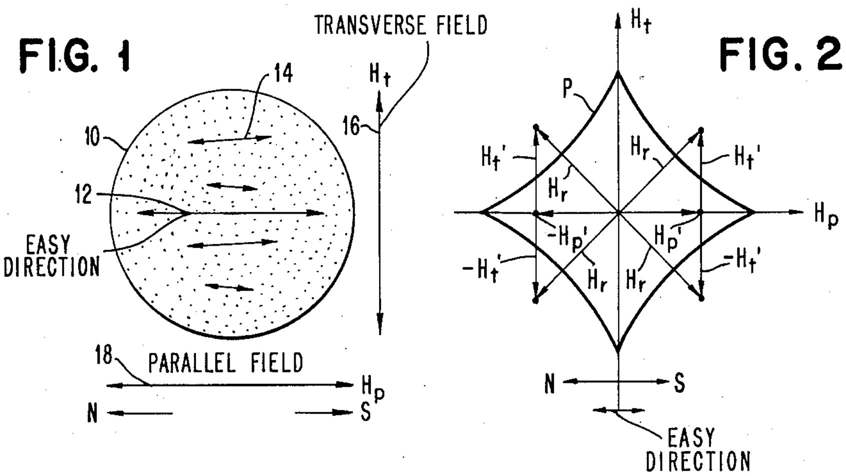
FIG. 1 illustrates a magnetic thin film element.
FIG. 2 is a plot of the rotational switching characteristics of the element of FIG. 1.

Generally, magnetic material may be considered as containing a multiplicity of small magnetically saturated regions which are called domains. In demagnetized materials these domains are randomly positioned such that the resultant magnetization of the specimen is zero. Changes in magnetization may be accomplished by rotation of the domains and by domain wall motion. In rotation a magnetic moment which is representative of each of the domains within the material, rotates similar to a compass needle. This type rotational mechanism provides very high switching speeds when switching from one to another stable magnetic state. Domain wall switching, on the other hand, is generally a slower process in which changes in the magnetization occur by the growth of domains parallel to the applied field at the expense of domains oriented antiparallel with the applied field.

Certain materials exhibit the characteristic of uniaxial anisotropy wherein the magnetic moments in the material tend to line up along an easy direction of magnetization. This characteristic may be produced in thin films of magnetic material which are in the order of 100 to 12,000 Angstroms in thickness, but it should be noted, however, that other forms of magnetic material, such as tapes and ferrites in appropriate geometries, also exhibit this characteristic under certain conditions. The preferred uniaxial anisotropic magnetic element employed in this invention is a thin magnetic film shaped in the form of a disc 10, as is shown in the FIG. 1, having a composition of approximately 83% nickel and 17% iron. The material is evaporated or otherwise deposited by suitable means on a substrate, not shown, usually of glass, in a high vacuum ($10^{-6}$ mm. Hg), to a thickness of approximately 2,600 Angstroms in the presence of a magnetic field such that the deposited material has a uniaxial anisotropic characteristic, i.e. a single easy direction of magnetization 12 along which magnetic moments 14 of the material tend to lie. The preferred direction of magnetization 12 of the film 10 is then the resultant direction along which all the magnetic moments 14 within the film 10 tend to align themselves. A magnetic field which is applied transverse to the preferred or easy direction of magnetization 12 of the film 10 is represented by a double-headed arrow 16 which may be symbolized by, and is hereinafter referred to as $H_t$. A transverse field, $H_t$, may be defined as a magnetic field applied parallel to the plane of the film 10 in such a direction as to produce a field perpendicular to the easy direction 12 of the film 10. A magnetic field which is applied parallel to the preferred direction of magnetization 12 of the film 10 is represented by a double-headed arrow 18 which may be symbolized by, and is hereinafter referred to as $H_p$. A parallel field, $H_p$, may be defined as a magnetic field applied parallel to the plane of the film 10 in such a direction as to produce a field parallel to the easy axis 12 of the film 10. It should be noted that both type fields, $H_t$ and $H_p$, may be applied in either direction as is indicated by the double-headed arrows 16 and 18, respectively. In order to provide a designation for the directions of residual magnetization which the moments 14 of the film 10 may assume, the direction of magnetization from right to left is arbitrarily designated as N while the direction of magnetization from left to right is arbitrarily designated as S.

Switching of the state of the element 10 as represented by the moments 14 from say the S to the N residual state or, from the N to the S residual state, is accomplished by applying a field $H_t$ and $H_p$ in at least partial coincidence. The field $H_t$ applies a torque to all the moments 14 within the element 10 to start rotation of the moments 14 in either the clockwise or counter-clockwise direction depending upon its direction. Under the influence of the field $H_t$, the moments 14 of the element 10 could rotate to a maximum of 90° with respect to the preferred direction of magnetization 12. With the combination of the field $H_p$ applied in coincidence with the field $H_t$, it may be seen that the moments 14 rotate toward the N state or from the N state toward the S state depending upon the direction of the field $H_p$ applied. The final state assumed by the element 10 is then not dependent upon the direction of the applied field $H_t$, but is dependent upon the direction of the applied field $H_p$, and the moments 14 of the element 10 rotate either clockwise or counterclockwise as a function of the initial state of the element and the direction of the applied transverse field $H_t$.

With reference to the FIGS. 1 and 2, and more particularly to the FIG. 2, the switching characteristic of a magnetic material having properties similar to the element 10 of the FIG. 1 is shown which comprises a plot of applied fields $H_t$ vs. $H_p$. The easy direction 12 of the film 10 is shown to be parallel to the horizontal coordinate $H_p$ and the arbitrarily designated remanence directions of N and S are also indicated. The dark lines which intersect each of the coordinates traversing the different quadrants define the critical region of switching, in that, within an area defined by the critical curves, labelled P, there is no rotational switching of the moments 14, and without this area P, rotational switching of the moments 14 does occur. An applied field, $H_p$, of insufficient magnitude to cause switching of the element 10 from one stable state to another is designated by the points $+H_p'$ and $-H_p'$. If the field $+H_p'$ or $-H_p'$ were applied to a magnetic material having the switching characteristics defined by FIG. 2, rotational reversal of the moments 14 within the material would not take place since the resultant field vector is not placed without the area P. An applied field, $H_t$, of insufficient magnitude to cause switching of the element 10 is designated by the points $+H_t'$ and $-H_t'$. If the field $+H_t'$ or $-H_t'$ were applied to the magnetic material having the switching characteristics as defined by FIG. 2, reversal of the moments 14 within the material again would not take place since the resultant field vector magnitude is insufficient to be placed without the area P. If, however, both the fields $+H_p'$ or $-H_p'$ and $+H_t'$ or $-H_t'$, are coincidently applied to the element 10, it may be seen that the resultant field vector $H_r$ in both instances is such that the applied magnetic fields result in a vector without the area P. It should be noted, however, that the magnitude of the field $H_p$ as delineated by the values $+H_p'$ or $-Hp'$, may be decreased while the magnitude of the applied fields $+H_t'$ or $-H_t'$, may be increased just so long as the resultant field vector $H_r$ is placed without the area P. Further, the direction of rotation which the moments 14 of the element 10 undergo upon application of the coincident fields $H_t$ and $H_p$ is determined by the state in which the magnetization of the element 10 is in, i.e. either the N or the S state, and, upon the direction of the field $H_t$ applied. The final state assumed by the element 10, however, is not dependent upon the applied field $H_t$, but is dependent upon the direction of the field $H_p$ applied.

By use of elements having the characteristics previously shown and described with reference to the FIGS. 1 and 2 above, a multiphase stable device, such as shown in the FIG. 3, may be constructed which is capable of providing output signals differing from one another by a predetermined phase relationship. Referring to the FIG. 3, the element 10 is again shown having an easy direction of magnetization 12 along which the magnetic moments 14 of the element 10 tend to lie. The element 10 is shown having a carrier winding 16 and a control winding 18, adapted to act as both an input and an output winding. The carrier winding 16 is connected with a generator 20 which is adapted to provide a continuously alternating voltage waveform having a frequency of $f_0$ to the carrier winding 16. The generator 20 in energizing the winding 16 with a current hereinafter referred as to $I_d$, applies a similarly alternating parallel field $H_p$ to the element 10, having its maximum magnitudes equal to the value $+H_p'$ and $-H_p'$ as shown in the FIG. 2. The control winding 18 has terminals 21 and 22 and a capacitor C is connected in parallel therewith such that the circuit is tuned to resonance at the frequency $f_0$ of the carrier drive $I_d$ and is also wound in quadrature to the carrier winding 16.

Arbitrarily, when all the moments 14 rotate in a clockwise direction the device will be referred to as being in the 1 state and when rotating in a counter-clockwise direction will be referred to as operating in the 0 state in representing binary information. As may be seen with reference to FIGS. 4A and 4B, with the current $I_d$ energizing the carrier winding 16, a voltage $E_0$ is measured across the terminals 21 and 22 having a current $I_0$ flowing in the control winding 18 where an angular displacement of $\alpha n$ exists between the resultant field of all the moments 14, as represented by a dashed arrow and a dashed coordinate line labelled 0° (0 degrees), when the element 10 is operating in the 0 and 1 state, respectively. Each of the labelled curves $I_d$, $E_0$, $I_0$ and $\alpha n$ are shown with respect to time, the current $I_0$ with the voltage $E_0$ is seen to have a constant phase relationship relative to each other regardless of operating state, i.e. either 1 or 0, the two states however are defined by an angular displacement of 180° with respect to $I_d$ as a function of its state.

Figure 3:
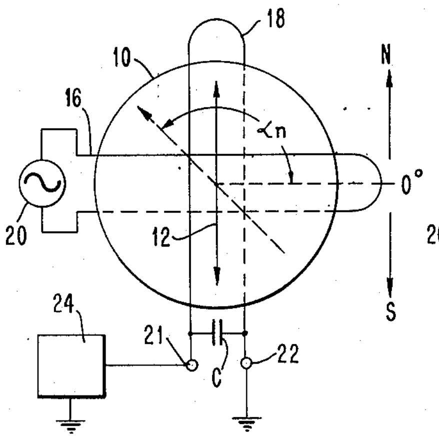
FIG. 3 is a circuit diagram of one embodiment of this invention.

Assume that the device of FIG. 3 is operating in the 0 state, i.e. all the moments 14 are rotating counterclockwise. The carrier source 20 in energizing the carrier winding 16 applies an alternating field which is parallel to the easy direction 12 of the film 10 having the peak magnitudes of $+_p'$ and $-H_p'$. As the moments 14 of the element 10 rotate under the influence of the applied field $H_p$, a voltage is induced in the control winding 18 which charges the capacitor C. As the field $H_p$ starts to decay and reverse its direction, the capacitor C discharges to energize the control winding 18 and provide a field transverse to the easy direction 12 having a magnitude similar to the field $-H_t'$. Thus the fields $-H_p'$ and $-H_t'$ cause rotation of the moments 14 to continue in a counterclockwise direction. Thereafter, a parallel field $H_p$ having a maximum amplitude equivalent to the field $+H_p'$ builds up which continues rotation of the moments in a counter-clockwise direction causing an induced voltage of opposite polarity to build up in the control winding 18 charging the capacitor C in reverse sense. Again, as the field $+H_p$ starts to decay, the capacitor C discharges to energize the control winding 18 and apply a transverse field whose maximum amplitude is similar to the field $+H_t'$ in the FIG. 2. The operation is continuous and the operating state is thus maintained. The circuit operates similarly when the moments 14 are rotating in the clockwise direction and once clockwise rotation of the moments 14 is initiated this direction is similarly maintained.

Assuming that the device of FIG. 3 is operating in the 0 state, i.e. all the moments 14 are rotating counter-clockwise, reversal of the operating state may be accomplished by application of a field $H_t''$ of predetermined magnitude which is in opposition to the field $H_t'$ applied by the control winding 18 upon discharge of the capacitor C. The opposing field $H_t''$ which is great enough to cause reversal of the direction in which the moments 14 are rotating may be provided by use of a further winding inductively linking the element 10 which is in alignment with the easy direction 12 or by energization of the control winding 18 by means of a source 24 connected with the winding 18 as shown by dotted lines adapted to energize the winding 18 with a pulse great enough to overcome the charge on the capacitor C and to apply a field equivalent to $H_t'$ in reverse sense to the element 10. Thus the moments 14 are caused to reverse their direction of rotation and assume the 1 state of operation. Similarly, when operating in the 1 state, reversal of the direction of rotation is accomplished by energizing the control winding 18 in reverse sense or, with a pulse of same polarity depending upon the point in the rotation of the moments 14 reversal is to be accomplished. For instance, consider the operation of the device in the 0 state, and the different waveforms depicting this state in the FIG. 4A. When the resultant direction of the moments 14 is in the S direction, as indicated by the labelled arrow and as shown in the FIG. 4A as time $t_1$, if the winding 18 is energized such that a resultant field of $H_t'$ were applied to the element 10 taking a Westerly direction, assuming the labelled direction S to be South and the labelled direction N to be North, then the moments 14 start rotation in a clockwise direction. Assuming the element 10 to have its moments 14 rotating in a clockwise direction, or operating in the 1 state, when the resultant direction of the moments 14 is North, labelled N and indicated in the FIG. 4B as time $t_2$, energization of the control winding 18 to provide a field $H_t'$ to the element 10 in a Westerly direction causes reversal and rotation of the moments 14 in a counter-clockwise direction. On the other hand, if we assume the device of FIG. 3 to be operating in the 1 state, when the resultant magnetization of the element 10 is in the S direction, South at a time $t_3$ as indicated in the FIG. 4B, the control winding 18 must be energized to apply a resultant field of $H_t'$ in an Easterly direction, necessitating therefore a pulse of opposite magnitude than the cases considered above.

In each of the instances discussed above, wherein the circuit of FIG. 3 may be switched from one operating stable state to another, i.e. the 0 to the 1 operating state or vice versa, a single pulse of either polarity was considered applied to the control winding 18 by means of the source 24 or by energization of another winding similarly located on the element 10. It is apparent, however, that application of a sinusoidal signal of the proper phase to the control winding 18 by the source 24 accomplishes the same results. More strikingly, it has also been found that although the circuit of FIG. 3 assumes either the 1 or the 0 operating state when initially fabricated and tested as described above, once the circuit has been operated in either the 1 or 0 states and the carrier source 20 is removed for any reason, reapplication of the source 20 establishes the circuit in the operating state previously assumed. More simply, if the circuit of FIG. 3 is made to operate in say the 0 state and the source 20 is removed, upon reapplication of the source 20 the circuit assumes the operating state.

The mechanisms involved are not completely understood, but it is believed that when the circuit of FIG. 3 is operating in a given state, say the 0 state, and the source 20 is removed, the residual magnetization, as represented by the direction of all the moments 14, does not align itself exactly with the easy direction 12 of the film 10. Instead, it is believed that since all the moments 14 were rotating counter-clockwise, that the resultant direction of residual magnetization of all the moments 14 lies at an angle with the easy direction 12 such that upon reapplication of the source 20 the moments 14 reassume their original direction of rotation. For instance, assume the circuit of FIG. 3 to be operating in the 0 state when the source 20 is removed, and that since the moments 14 of the film 10 were rotating counter-clockwise, that the residual magnetization assumed by the moments 14, as represented by the dotted vector, is at an angle of approximately 135° with the labelled 0° reference, which direction is exaggerated for descriptive purposes. Upon reapplication of the source 20, the carrier winding 16 is energized to apply a continuously varying parallel field $H_p$ with respect to the original direction of orientation 12. Assuming the first maximum field of $-H'$ is provided to rotate the moments 14 and hence the dotted vector in a clockwise direction, since the maximum applied field of $-H_p'$ is not, in and of itself, capable of rotating the moments 14 of the film to an angle 90° with respect to the dashed 0° reference line (observe the FIG. 2 wherein the field $-H_p'$ or $+H_p'$ is not of a magnitude to reach the intersection point of the critical curves on the coordinate axis $H_p$), there is very slight movement of the dashed magnetization vector toward the N direction. As the field $H_p$ approaches the value $+H_p'$, the moments 14 rotate counter-clockwise, and thus the dashed resultant vector rotates toward the S direction. This rotation takes place since the angle which the dashed vector assumed as a residual magnetic state is somewhat similar to the angle provided by the simultaneous application of a transverse field $H_t'$. This rotation of the moments 14 then induces a sufficient voltage in the control winding 18 to charge the capacitor C and provide a transverse field substantially equal to the field $H_t'$ and thus the 0 operating state is established. The same type reasoning is applied to the instance when the circuit is operating in the 1 state, since it is believed that the direction of residual magnetization would then be defined by a vector such as shown in the FIG. 3 by the dashed lines at an angle somewhere about 45° or −135° with the base 0° reference lines.

In the embodiment of FIG. 3 discussed above, switching from one operating state to another is accomplished by application of a transverse field $H_t'$ to the element 10 at the correct time. It has been found that when the device of FIG. 3 is operating in a given state, i.e., the 0 or 1 operating state, reversal of the rotation of the moments 14 may be accomplished by utilization of a field applied substantially perpendicular to the plane of the film 10. Referring to the FIG. 5, the device of FIG. 3 is again shown having the same reference numerals with the addition of a switching winding 26 wound about the periphery of the element 10. Energization of the winding 26 in one sense or an opposite sense provides a field perpendicular to the plan of the film 10 either into or out of the page.

Figures 4A, 4B:
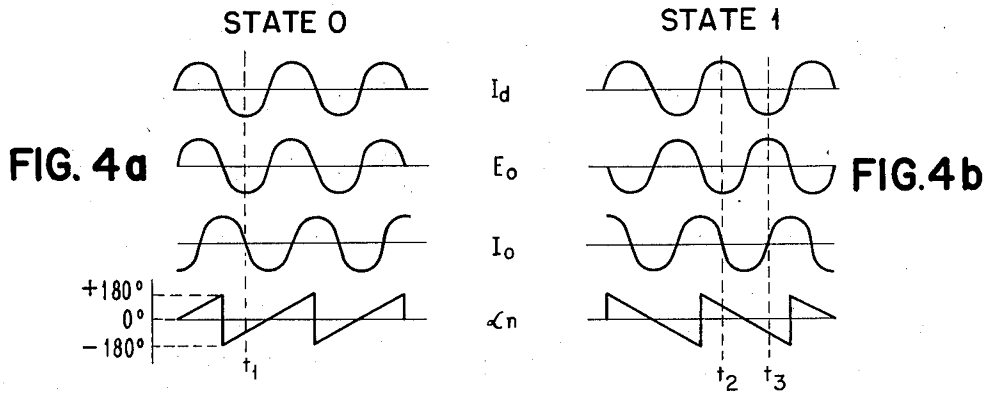
FIGS. 4A and 4B illustrate the various voltage and current waveforms of the device of FIG. 3 when operated in a first and a second stable operating state, respectively.
Figure 5:
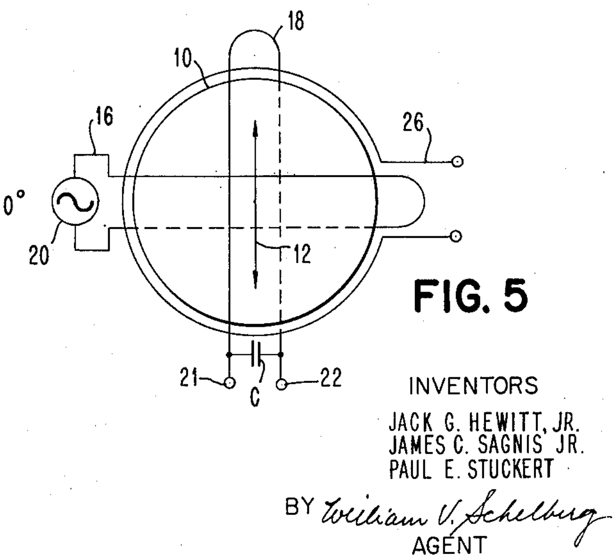
FIG. 5 is another embodiment of this invention.

With reference to the FIG. 5, if the device is operating in the 0 or 1 state as defined by the curves in the FIGS. 4A and 4B, respectively, energization of the winding 26 applies a field to the element 10 which is substantially perpendicular to the plane of the film and causes the device of FIG. 5 to switch from one operating state to another. The field applied by energization of the winding 24 may be symbolized by and is hereinafter referred to as $H_z$. What takes place is not understood, nor has any suitable theory been advanced to describe the internal mechanisms involved, however it has been found, experimentally, that the field $H_z$ may be applied momentarily or over a long period of time with the same result, in that the operating state of the circuit of FIG. 5 is reversed. Arbitrarily, a field $H_z$ applied to the film element 10 which is directed into the page may be defined as that field necessary to switch the operating state of the device from the 1 to the 0 state while a field $H_z$ directed out of the page switches the device from the 0 to the 1 operating state. There seems to be no relation between the time at which the field $H_z$ is applied and when switching from one operating state to another takes place. Since switching, in the manner described above, takes place without shielding from the earth's field, the combination of both the earth's field and the applied field $H_z$ lends no understanding to explain the switching phenomena. This may be understood when considering both the field $H_z$ and the earth's field, hereinafter symbolized by $H_e$. Since the field $H_z$ is substantially perpendicular to the surface of the film 10, it has no appreciable components parallel to the plane of the film, while the field $H_e$ may be at some angle having a component $H_{ex}$ and $H_{ey}$ parallel to the plane of the film. These components $H_{ex}$ and $H_{ey}$ are continuously applied and available when the device of FIG. 5 is normally operating in the 0 or 1 stable states and when the switching field $H_z$ is applied. Since the components of earth's field $H_{ex}$ and $H_{ey}$ have no effect on the operation of the device of FIG. 5 when in a normally operating stable state and the switching field $H_z$ is perpendicular to the plane of the film 10 having no appreciable component aiding the field $H_{ex}$ and $H_{ey}$, consideration of the earth's field is eliminated.

Further, assuming that the applied field $H_z$ were not exactly perpendicular to the plane of the film 10 and that there was in fact a component of the field $H_z$ which aided the field $H_{ex}$ and $H_{ey}$, the switching phenomena is still not explained since, as stated above, the field $H_z$ may be applied for a long period of time with no deleterious effects still accomplishing the switching function. Consider for example the device of FIG. 5 operating in the 0 state with the moments 14 rotating counter-clockwise, and a switching field $H_z$ is applied directed into the page which has a component aiding the earth's component field $H_{ex}$ and $H_{ey}$. As stated above, the moments 14 reverse their direction of rotation upon application of the field $H_z$ and start rotating clockwise. Assume that the component fields applied are directed Easterly to overcome the field $-H_t'$ and upon application of the field $H_p'$ start to rotate clockwise. When the moments 14 rotate approximately 180° again the applied fields directed Easterly would overcome the field $-H_t'$ and upon application of the field $-H_p'$ the moments 14 would start rotating counter-clockwise again through approximately 180°. Thus the moments 14 would oscillate at a frequency of approximately $2f_0$ rather than completely rotate, as long as the field $H_z$ is applied. This, however, is not the case. When the field $H_z$ is applied the moments 14 reverse their direction of rotation and start operating in an opposite stable state completely rotating in either a clockwise or counter-clockwise direction. Thus the field $H_z$ may be applied which is substantially perpendicular to the plane of the element 10 to cause switching from one operating state to another.

In the interest of providing a complete disclosure, details of the embodiments of FIGS. 3 and 5 are given below, however, it is to be understood that other component values and current magnitudes may be employed with satisfactory operation obtained so that the values given should not be considered limiting.

With the element 10 having a rotational switching threshold of 5.08 oersteds, the carrier drive 20 has a frequency of 7.0 mc. applied to the carrier input winding 16 to produce a sinusoidal field of 3.17 oersteds peak value. The control winding 18 comprises 8 turns with the capacitor C having the value of 2000 micro-microfarads. The control winding 18 has an inductance of 47 milli-microhenries therefore necessitating close proximity of the windings with respect to the film with the field applied substantially perpendicular to the film 10 having the value of 3.0 oersteds.

While the invention has been particularly shown and described with reference to preferred embodiments thereof, it will be understood by those skilled in the art that various changes in form and details may be made therein without departing from the spirit and scope of the invention.

What is claimed is:

1. A circuit comprising a magnetic film element defining a portion of a flux path only and exhibiting an easy axis of magnetization defining different stable states, of remanent flux orientation means for applying a varying field of a given frequency to the easy axis of said element, and input-output resonant circuit means tuned to resonate at said given frequency coupling said element in quadrature with the easy axis of said element.

2. A device comprising a magnetic element having a plurality of moments capable of being rotated in one or another direction; said element exhibiting an easy axis of magnetization defining opposite stable states of remanent orientation for said magnetic moments; means coupling said element for continuously rotating said moments in either said one direction to define a first stable operating state of said device or in the other direction to define a second stable operating state of said device, said means operable to provide an output signal indicative of the operating state of said device, and signal input means connected to said last means for switching said device from one to another of said operating states.

3. A circuit comprising a magnetic element having a plurality of magnetic moments and an easy axis of magnetization along which said moments tend to align themselves to define opposite stable states of remanent flux orientation, field applying means for continuously rotating said moments selectively in one direction and an opposite direction to define a first and a second stable operating state of said device, and means for applying a switching field to said element whereby said device is switched from one to another of said stable operating states.

4. A device comprising a magnetic element having a plurality of magnetic moments and an easy axis of magnetization along which said moments tend to align themselves to define opposite stable states of remanent flux orientation, carrier source means and control means coupling said element in quadrature with one another for continuously rotating said moments selectively in one direction and an opposite direction defining a first and a second stable operating state of said device, and means including said control means for selectively switching said device from one to another of said stable operating states.

5. A circuit comprising a anisotropic magnetic element having a plurality of magnetic moments and an easy axis of magnetization along which said moments tend to align themselves to define opposite stable states of remanent flux orientation, winding means coupling said element, field applying means including a first and a second winding of said winding means coupling said elements in quadrature with one another for continuously rotating said moments selectively in one direction and an opposite direction defining a first and a second stable operating state of said device, and means including a further one of said winding means for applying a field to said element to switch said device from one to another of said stable operating states.

6. The circuit of claim 5, wherein said first winding is energized to apply a constantly varying field parallel to said easy direction.

7. The circuit of claim 6 including a capacitor connected in parallel with said second winding whereby said second winding coupling said element and said capacitor define a resonant circuit tuned to the frequency at which said parallel field is varied.

8. The circuit of claim 7, wherein said magnetic element is a thin magnetic film having a uniaxial anisotropy.

9. A device comprising a planar anisotropic magnetic element having a plurality of magnetic moments and an easy axis of magnetization along which said moments tend to align themselves in the plane of said element to define opposite stable states of remanent flux orientation, means for continuously rotating said moments selectively in a clockwise and a counter-clockwise direction to define a first and a second stable operating state of said device, and further means for applying a field substantially perpendicular to the plane of said element to switch said device from one to another of said stable operating states.

10. In a device comprising a planar uniaxial anisotropic magnetic element having a plurality of magnetic moments and an easy axis of magnetization along which said moments tend to remanently align themselves, said moments when rotating in one direction defining a first stable operating state of said device and when rotating in another direction defining a second stable operating state of said device, field applying means comprising a first and a second winding coupling said elements in quadrature with one another for maintaining said device in said stable operating states, and an apparatus for switching said device from one to another of said stable operating states comprising a further winding coupling said element for applying a field substantially perpendicular to the plane of said element.

11. Apparatus for storing information in a magnetic element having a plurality of magnetic moments comprising means for continuously rotating said moments selectively in a first and a second direction to define first and second dynamic stable states; and means for applying a field to said element to cause said element to switch from one to another of said stable states.

12. Apparatus as set forth in claim 11, wherein the field applied to said element to cause said element to switch from one to another of said stable states is directed substantially in alignment with the axis of rotation of the moments.

13. In a circuit comprising a planar magnetic element exhibiting an easy axis of magnetization and having means coupled thereto to establish said element in either a first stable state or a second stable state, means for switching said element from one to another of said stable states comprising means for applying a field directed substantially perpendicular to the plane of said element.

References Cited in the file of this patent

UNITED STATES PATENTS

| | | |
|---|---|---|
| 2,883,604 | Mortimer | Apr. 21, 1959 |
| 2,919,432 | Broadbent | Dec. 29, 1959 |

FOREIGN PATENTS

| | | |
|---|---|---|
| 778,883 | Great Britain | July 10, 1957 |

OTHER REFERENCES

Publication I, "A Compact Coincident-Current Memory," A. U. Pohm, Proceedings of Eastern Joint Computer Conference, Dec. 10–12, 1956.

"Magnetization Reversal and Thin Films," D. O. Smith, Journal of Applied Physics, vol. 29, No. 1, March 1958, pp. 264–273.

"Using Thin Films in High Speed Memories," Eric E. Bittman, Electronics, June 5, 1959, pp. 55–57.

UNITED STATES PATENT OFFICE

CERTIFICATE OF CORRECTION

Patent No. 3,123,717 March 3, 1964

Jack G. Hewitt, Jr., et al.

It is hereby certified that error appears in the above numbered patent requiring correction and that the said Letters Patent should read as corrected below.

Column 1, line 25, for "flm" read -- film --; column 6, line 6, before "operating" insert -- 0 --; column 8, line 20, after "frequency" insert -- parallel --.

Signed and sealed this 14th day of July 1964.

(SEAL)

Attest:

ESTON G. JOHNSON
Attesting Officer

EDWARD J. BRENNER
Commissioner of Patents